United States Patent [19]

Spiess et al.

[11] 4,214,314
[45] Jul. 22, 1980

[54] PRECISION TRANSPONDER AND METHOD OF COMMUNICATING THEREWITH

[75] Inventors: Frederick N. Spiess, La Jolla; Dwight E. Boegeman, San Diego; Frank V. Pavlicek, San Diego; Carl D. Lowenstein, San Diego, all of Calif.

[73] Assignee: Regents of the University of California, Berkeley, Calif.

[21] Appl. No.: 885,893

[22] Filed: Mar. 13, 1978

[51] Int. Cl.$^2$ ............................................. H04B 1/59
[52] U.S. Cl. .................................. 367/2; 343/6.8 LC
[58] Field of Search ............ 340/2, 3 E; 343/6.8 LC, 343/6.8 R

[56] References Cited

U.S. PATENT DOCUMENTS

| | | | |
|---|---|---|---|
| 2,845,621 | 7/1958 | Hasbrook | 343/13 |
| 2,978,699 | 4/1961 | Dodington | 343/18 E |
| 3,051,948 | 8/1962 | Faymoreau et al. | 343/103 |
| 3,076,190 | 1/1963 | Shames et al. | 343/6.8 LC X |
| 3,113,268 | 12/1963 | Horak | 325/6 |
| 3,178,705 | 4/1965 | Clock et al. | 343/6.8 LC |
| 3,184,737 | 5/1965 | Child | 343/6.8 |
| 3,412,381 | 11/1968 | Hirsch et al. | 343/6.8 LC X |
| 3,432,853 | 3/1969 | Wise | 343/6.8 |
| 3,513,470 | 5/1970 | Rabow | 343/6.8 R |
| 3,524,201 | 8/1970 | Land, Jr. | 343/6.8 R |
| 3,685,050 | 8/1972 | Cartwright | 343/6.8 R X |
| 3,721,906 | 3/1973 | Geesen et al. | 343/6.8 LC X |
| 3,896,441 | 7/1975 | Richmond | 343/18 E |
| 4,005,418 | 1/1977 | Gorwara | 343/6.8 R |
| 4,006,477 | 2/1977 | Yost, Jr. et al. | 343/6.8 R |
| 4,059,831 | 11/1977 | Epstein | 343/6.8 R |

*Primary Examiner*—Richard A. Farley
*Attorney, Agent, or Firm*—Brown & Martin

[57] ABSTRACT

A method of communicating with a remote precision transponder includes the step of transmitting first signals to the transponder. The first signals are received in the transponder, and second signals representative of the first signal are delayed therein for a precise time interval. After the precise time interval, third signals representative of the delayed second signals are transmitted from the transponder. Detailed embodiments of a transponder for performing these steps are also disclosed.

10 Claims, 15 Drawing Figures

PRECISION TRANSPONDER AND METHOD OF COMMUNICATING THEREWITH

BACKGROUND OF THE INVENTION

The disclosed invention relates to methods and apparatus for communicating with spaced apart electronic units, and more particularly to methods and apparatus for communicating underwater with acoustic transponders. Such transponders are utilized for example to determine the distance or velocity of ships with respect to the transponder. Basically, distance measurements are made by sending a signal to the transponder, receiving a reply signal from the transponder, and multiplying the response time by the velocity at which the acoustic signals travel. Ship velocity is basically determined by transmitting signals of one frequency from the ship, reflecting these signals from the transponder, receiving the reflected signals in the ship, and examining the received signals for a doppler frequency shift.

Prior art transponders which are utilized to perform these functions are basically of two types. One type transponder simply operates a repeater station. That is, the signals received at the transponder are amplified and retransmitted without other processing or delay. However, a problem associated with such repeater transponders is that their transmit section and receive section must be physically separated; otherwise they will form a closed loop and go into oscillation. The amount of required separation and actual separation are variables which are difficult to determine. Thus, these variables detract from the accuracy with which distance and velocity measurements can be made.

Conventional transponders of a second type have the transmit and receive sections physically integrated in one unit. In operation, these transponders listen for a "triggering" or "recognition" signal. When the triggering signal is received, the transponder internally generates and transmits a pre-programmed response signal. This transponder avoids closed loop oscillations because the response signal will not trigger the receive section. However, this transponder is deficient in that the time it takes to recognize the triggering signal is not accurately predictable. For example, the recognition time is dependent upon the signal level received. Thus, the time delay between receipt of a triggering signal and transmission of a response signal is a variable, which detracts from the accuracy of the distance and velocity measurements which can be made. Further, with this type transponder, the response signal is fixed, or is at least limited, to some preprogrammed number in accordance with the complexity of the transponder. Thus, the flexibility of the transponder is limited in that its responses cannot be readily varied.

Accordingly, it is one object of the invention to provide an improved transponder.

Another object of the invention is to provide a transponder having a precise predetermined response time.

Another object of the invention is to provide a transponder wherein signals are received and signals representative of the received signals are retransmitted after a precise time delay.

Another object of the invention is to provide an improved method for communicating with a remote transponder.

Another object is to provide a method of determining, to a high degree of precision, distance from a remote transponder.

Still another object of the invention is to provide a method of determining, to a high degree of precision, velocity with respect to a remote transponder.

SUMMARY OF THE INVENTION

These and other objects are accomplished in accordance with the invention by transmitting a triggering signal to an improved remote transponder. The triggering signal is followed by a timing signal. The triggering signal is recognized in the remote transponder, and in response thereto, the transponder enables a precise delay circuit contained therein. The timing signals are received by the transponder, and signals representative thereof are stored in the delay circuit. After a precise delay from their receipt, signals representative of the timing signals are transmitted by the transponder. In one embodiment of the transponder, the delay circuit stores the timing signals in sampled digital form in a digital memory. In another embodiment, the signals are stored in sampled analog form in a charge-coupled device. In still another embodiment, the timing signals are stored in continuous analog form in a surface wave device.

BRIEF DESCRIPTION OF THE DRAWINGS

The novel features believed characteristic of the invention are set forth in the appended claims; the invention itself, however, as well as other features and advantages thereof, will best be understood by reference to the following detailed description of particular embodiments read in conjunction with the accompanying drawings, wherein:

DETAILED DESCRIPTION

Figure 1:
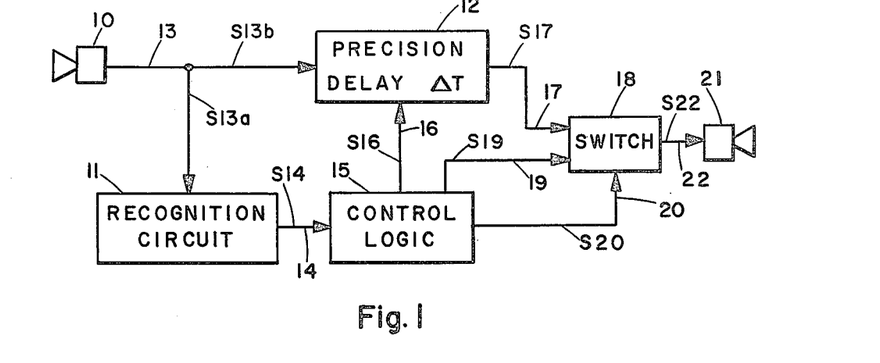
FIG. 1 is a block diagram of a transponder constructed according to the invention.

Referring now to FIG. 1, a first embodiment of an electronic transponder constructed according to the invention will be described. This embodiment includes a hydrophone 10 for receiving recognition signals and timing signals from a remote source not shown. These signals will be described in greater detail in conjunction with FIG. 1. The output of hydrophone 10 couples to a recognizing circuit 11 and to a precision delay cricuit 12 via leads 13. Signals S13A and S13B respectively are electronic representations of the received recognition and timing signals as generated on leads 13 by hydrophone 10.

In operation, recognition circuit 11 operates to recognize signals S13A; and it generates output signals S14 on leads 14 indicating that recognition has occurred. A time interval which is unpredictable to a high degree of accuracy occurs between the start of signals S13A and S14. This delay may vary between 10NS to 2MS, for example. Leads 14 couple to a control logic circuit 15. In response to signals S14, logic circuit 15 generates output signals S16 on leads 16 which connect to control inputs on precision delay circuit 12. Signals S16 operate to activate delay circuit 12. That is, in response to signals S16, circuit 12 delays whatever signals are on leads 13 for a precise time interval $\Delta T$. Thus, so long as delay circuit 12 is enabled prior to the occurrence of signals S13B, and so long as circuit 12 remains enabled until after signals S13B ends, the entire signal S13B is delayed by circuit 12 for the precise time interval $\Delta T$. Delay circuit 12 has an output coupled via leads 17 to one input of a switch 18. Signals S17, which are representative of signals S13B, are generated on lead 17 by circuit 12. The time delay between signals S13B and S17 is precisely $\Delta T$. Switch 18 also has a second input, coupled via a lead 19 to an output of control logic circuit 15. Leader signals S19 are generated thereon by circuit 15. In operation, switch 18 passes either signals S17 or S19, or neither, in response to control signals S20 on leads 20 from control logic circuit 15. The output of switch 18 couples to the input of a transducer 21 via leads 22. Transducer 21 operates to transmit signals representative of signals on lead 22.

Figure 2:
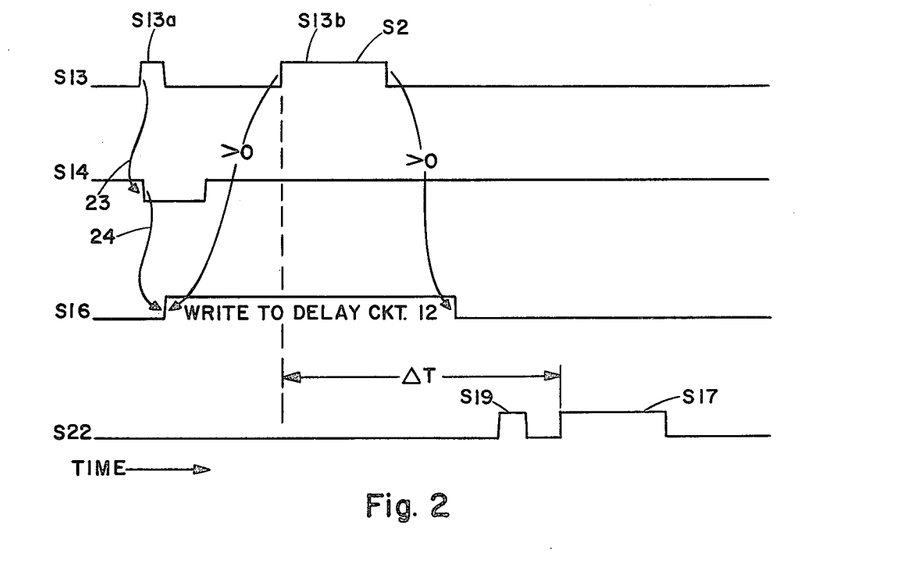
FIG. 2 is a timing diagram of signals at various points in the transponder of FIG. 1.

A timing diagram of signals at various points within the above described transducer is illustrated in FIG. 2. Specifically, FIG. 2 illustrates signals S13A, S13B, S14, S16, and S22. The signal sequence begins with the occurrence of signal S13A. In response to signal S13A, circuit 11 generates signals S14. The delay between the start of signals S13A and S14 is indicated via reference numeral 23, as variable which is not accurately predictable. In response to signal S14, control logic circuit 15 activates delay circuit 12 by means of signals S16. Another variable delay 24 may occur here. Delay circuit 12 operates in response to signals S16 by inputting data on leads 13 for a time interval which overlaps the time interval during which signals S13B are received. Also in response to signals S16, circuit 12 delays all signals which it receives for the precise time interval $\Delta T$. Control circuit 15 enables switch 18 to sequentially output signals S19 and S17. Typically, leader signals S19 act as a "triggering" or recognition signal for the unit to which the transponder is transmitting signals S17.

With reference to FIG. 2, it is to be understood that recognition signals S13A, timing signals S13B, and leader signals S19 may suitably be of a variety of forms. In one preferred embodiment, signal S13A is a single frequency tone of a predetermined time duration. Suitably, the frequency is 10 kHz and the time duration is three milliseconds. A recognition circuit 11 suitable for operation with such a signal is described in U.S. Pat. No. 3,517,214, issued June 30, 1970 to Dwight Boegeman. The teachings of that patent are herein incorporated by reference.

Preferably, timing signal S13B is in the form of a carrier frequency which is either frequency modulated, phase modulated, amplitude modulated, or any combination thereof. Also preferably, the carrier frequency is between 8 kHz and 16 kHz. A suitable time duration for signal S13B is approximately 30 milliseconds, and a corresponding suitable delay $\Delta T$ is approximately 42.67 milliseconds. The detailed specific embodiment which is to be described in conjunction with FIGS. 3–7 is operable with signals having these parameters. Also preferably, leader signal S19 is a single frequency tone of a predetermined time duration. In one disclosed detailed embodiment which follows, signal S19 is a tone of 12 kHz, and it lasts for 2.67 milliseconds.

Figure 3A:
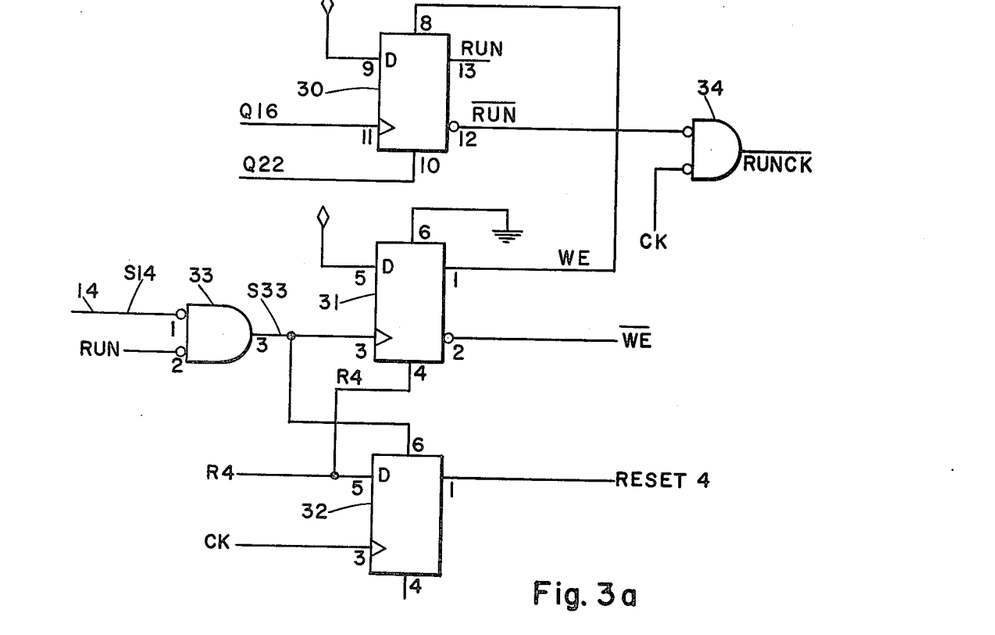
FIG. 3A is a logic diagram of a portion of a control logic circuit within the FIG. 1 transponder.
Figure 3B:
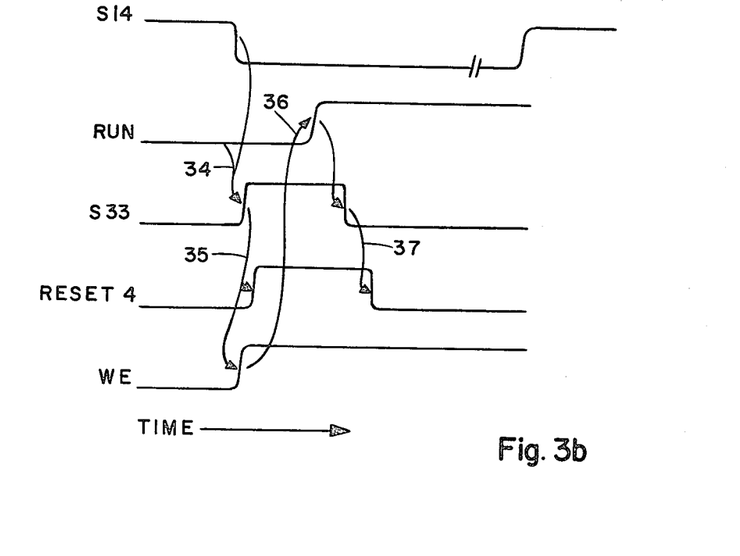
FIG. 3B is a timing diagram illustrating the operation of the circuit of FIG. 3A.

Referring now to FIG. 3, there is illustrated a logic diagram of a portion of control logic 15, and a timing diagram illustrating the operation thereof. The illustrated portion includes flip-flops 30, 31, and 32. These flip-flops are triggerable D-type such as are on a 4013 chip. The illustrated portion of circuit 15 also includes two NOR gates 33 and 34. which suitably are implemented with 4001 chips. Components 30–34 are interconnected as illustrated in FIG. 3A. In operation, signals S14 goes from a logical high to a logical low when recognition circuit 11 recognizes signal S13A. The combination of signal S14 going low and a logic signal RUN being low causes output signal S33 of gate 33 to go high. This is indicated at 34 in FIG. 3B. in response to signal S33 going high, flip-flop 32 sets and generates a high output signal RESET 4. The low to high transition of signal S33 also sets flip-flop 31. These actions are indicated at 35 in FIG. 3B. The setting of flip-flop 31 causes the logical signal WE at the output of flip-flop 31 to go high and this high signal in turn sets flip-flop 30 as indicated at 36. Flip-flop 30 is a source of the previously described RUN signal. In response to signal RUN going high, the output of gate 33 goes to a low logical level. This in turn enables flip-flop 32 to be reset in response to a master oscillator signal CK. Accordingly, signal RESET 4 is a pulse as illustrated at 37 in FIG. 3B. The RESET 4 pulse in combination with signal RUN, and master oscillator signal CK, are utilized within another portion of logic circuit 15 for the generation of signals S16 such that date is input to delay circuit 12. This portion of circuit 15 is illustrated in FIG. 4.

Figure 4A:
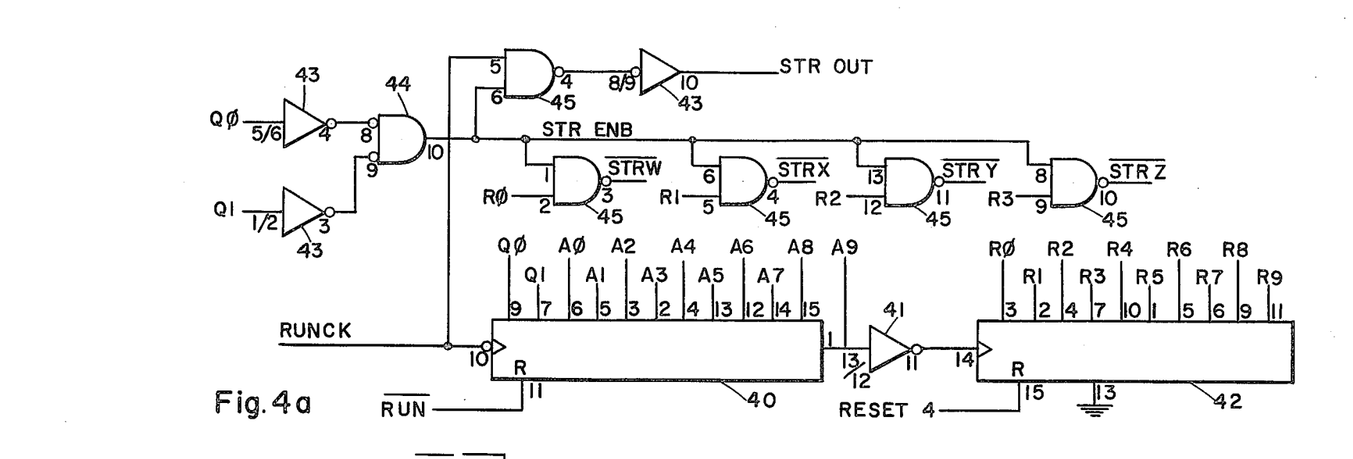
FIG. 4A is a logic diagram of a portion of the control circuit within the transponder of FIG. 1.
Figure 4B:
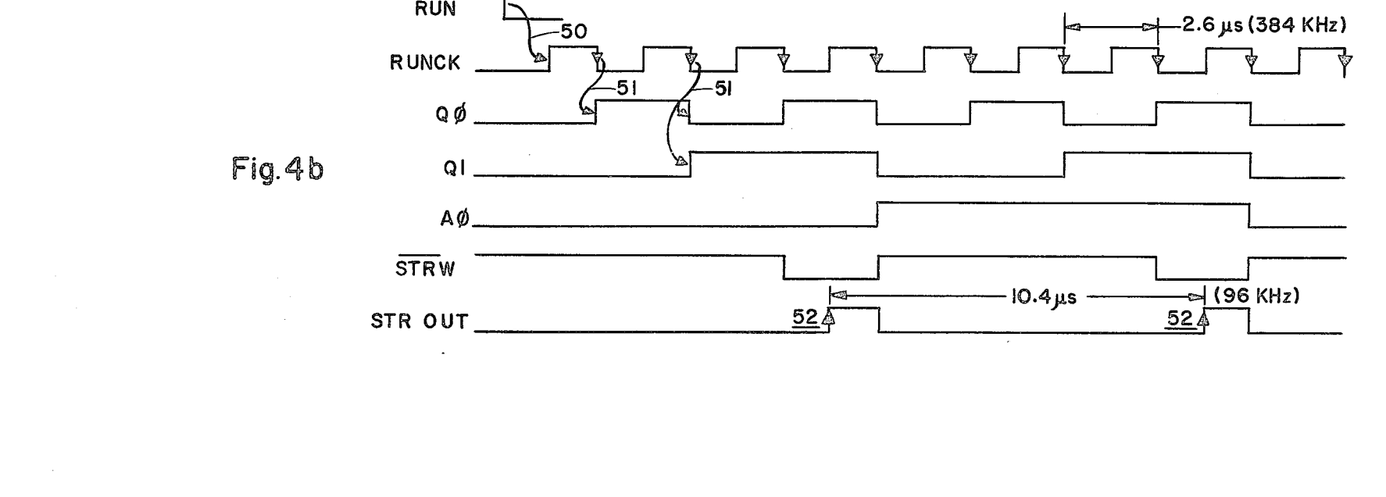
FIG. 4B is a timing diagram illustrating the operation of the circuit of FIG. 4A.

Referring now to FIG. 4A, there is illustrated a portion of control logic 15 which includes a binary counter 40 having its highest order output bit coupled through an inverter gate 41 to a clock input of a decoded decimal counter 42. Suitably, counter 40, inverter 41, and counter 42 are constructed of a 4040 chip, a 4001 chip and a 4017 chip respectively. Counter 40 is reset by signal $\overline{\text{RUN}}$ being high; and counter 42 is reset by signal RESET 4 being high. Chips 40 and 42 generate output signals Q0, Q1, A0–A9, R0–R9 Which basically are used to address various memory cells within a digital memory that forms a portion of delay circuit 12. Accordingly these signals comprise a portion of signals S16. Also included within FIG. 4 are inverter gates 43, NOR gate 44, and NAND gates 45. Gates 43–45 may suitably be implemented by a 4001 chip, a 4001 chip, and a 4011 chip, respectively. Circuits 40–45 are interconnected as illustrated in FIG. 4A, and their operation is illustrated in FIG. 4B. In particular, in response to signal $\overline{\text{RUN}}$ going low, signal RUNCK is enabled to oscillate. In response thereto, counter 40 counts up as indicated via signals Q0, Q1, and A0. These signals are used to address various portions of delay circuit 12.

Control signals $\overline{STRW}$ and STROUT are also generated in response to the oscillations of signal RUNCK. In particular, signal $\overline{STRW}$ goes low for each fourth cycle of signal RUNCK; and signal STROUT goes high during a portion of the time in which signal $\overline{STRW}$ is low as indicated at 52 in FIG. 4B. Accordingly, the frequency of signal $\overline{STRW}$ and STROUT are ¼ the frequency of signal RUNCK, or approximately 96 kHz. These signals are utilized to write information in to delay circuit 12 as will now be described in conjunction with FIG. 5.

Figure 5A:
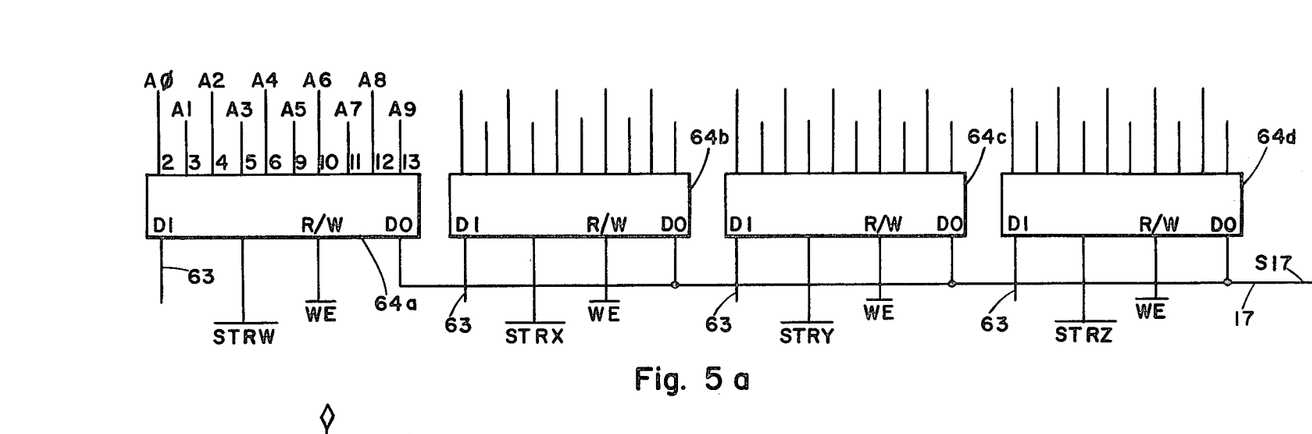
FIGS. 5A and 5B are logic diagrams of a precision delay circuit included within the transponder of FIG. 1.
Figure 5B:
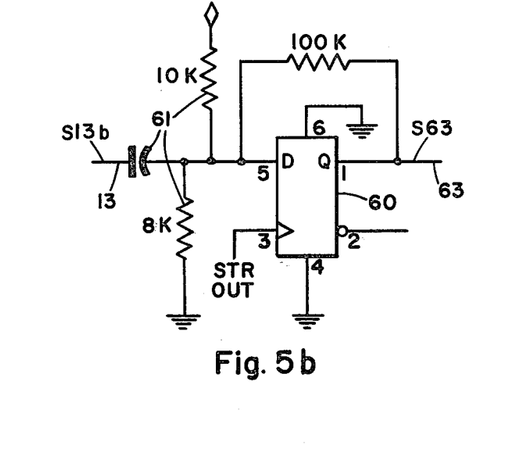
Figure 5C:
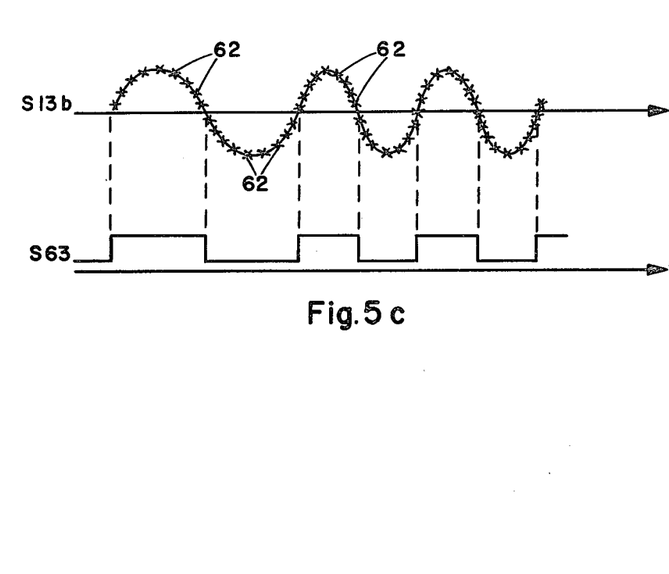
FIG. 5C is a timing diagram illustrating the operation of the circuit of FIGS. 5A and 5B.

FIG. 5 is a detailed logic diagram of delay circuit 12. Included therein is a triggerable D flip-flop 60 which suitably may be a 4013 chip. Signal S13B AC couples through an R-C circuit 61 to a D input on flip-flop 60. Signal STROUT clocks flip-flop 60. That is, flip-flop 60 operates to sample signal S13B at a rate of 96 kHz as indicated in FIG. 5C via X's 62. An output of flip-flop 62 couples via lead 63 to digital memory chips 64A-64D. Signals S63 are generated on lead 63 in response to the above described samples as indicated in FIG. 5C. Accordingly, flip-flop 60 operates to generate a digital signal S63 representative of analog signal S13B. The resolution of signal S63 is within one period of the sampling rate, which in this particular embodiment is 96 kHz. And thus, the accuracy of delay $\Delta T$ through circuit 12 is the inverse of 96 kHz or 10.4 US. This delay is of course independent of any variation in delay through recognition circuit 11.

Signals S63 are stored in memory chips 64A-64D in response to the previously described signals A0-A9, $\overline{WE}$, and $\overline{STR}$. Each of the chips 64A-64D contains 1024 bits of memory storage. Suitably, these memory elements may be implemented by IM6508 chips. In operation, signal $\overline{STRW}$ selects chip 64A until each of the memory locations is written into. Subsequently, signals $\overline{STRX}$ and $\overline{STRY}$ and $\overline{STRZ}$ respectively select chips 64B, 64C and 64D until each of those chips are written into.

Figure 6A:
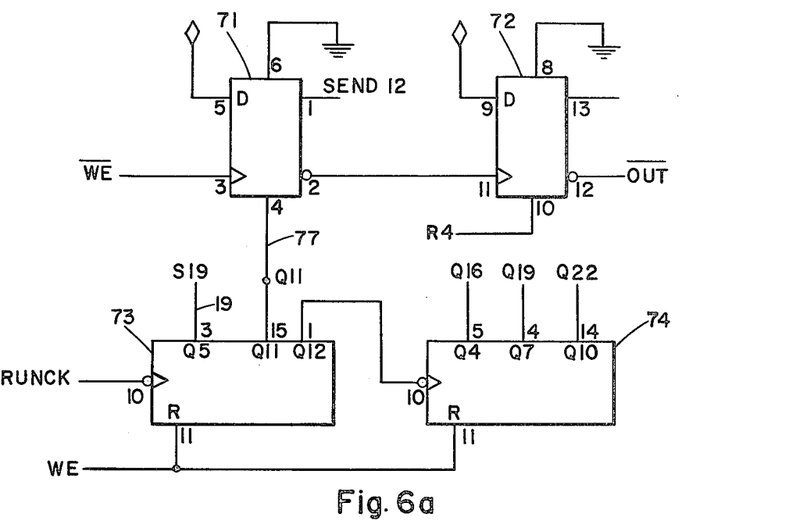
FIG. 6A is a logic diagram of a portion of the control circuit within the transponder of FIG. 1.
Figure 6B:
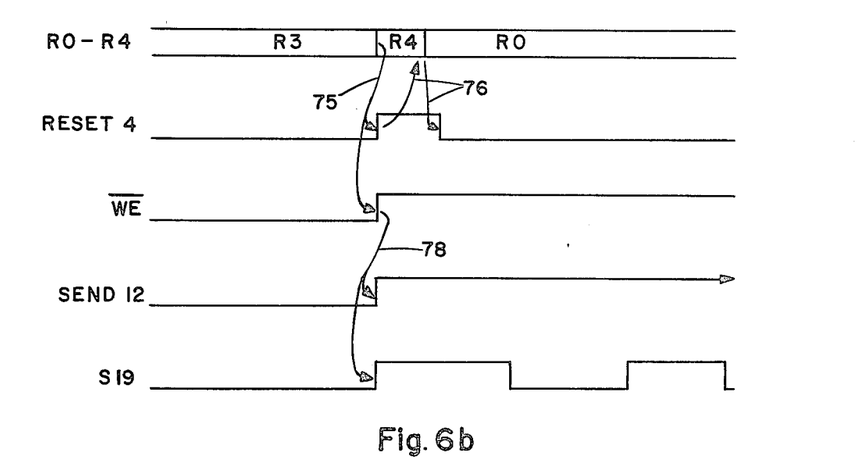
FIG. 6B is a timing diagram illustrating the operation of the circuit of FIG. 6A.

After memory elements 64A-64B are filled, control logic circuit 15 generates signals S16 so as to stop delay circuit 12 from receiving more data, and to enable delay circuit 12 to output the data stored therein. FIG. 6A is a detailed logic diagram of that portion of circuit 15 which accomplishes this output operation. This logic circuitry includes two triggerable flip-flops 71 and 72, and two 12 bit binary counters 73 and 74. Suitably, flip-flops 71 and 72 are 4013 chips, and counters 73 and 74 are 4040 chips. Chips 71-74 are interconnected as illustrated in FIG. 6A and their operation is illustrated in FIG. 6B.

Delay circuit 12 stops storing data and starts outputting the data stored therein when logic signal R3 goes false and logic signal R4 goes true. In response to signal R4 going true, flip-flop 32 sets and flip-flop 31 resets. These flip-flops were previously illustrated in FIG. 3A. In response to this setting and resetting, signal RESET 4 and $\overline{WE}$ go high. This is indicated at 75 in FIG. 6B. The high level of signal RESET 4 feeds back to counter 42 and causes signals R4 to go low and signal R0 to go high. The low level of signal R4 feeds back to flip-flop 32 which causes signal RESET 4 to go low again after the next CK pulse. These transitions are indicated in FIG. 6B at 76.

Figure 7A:
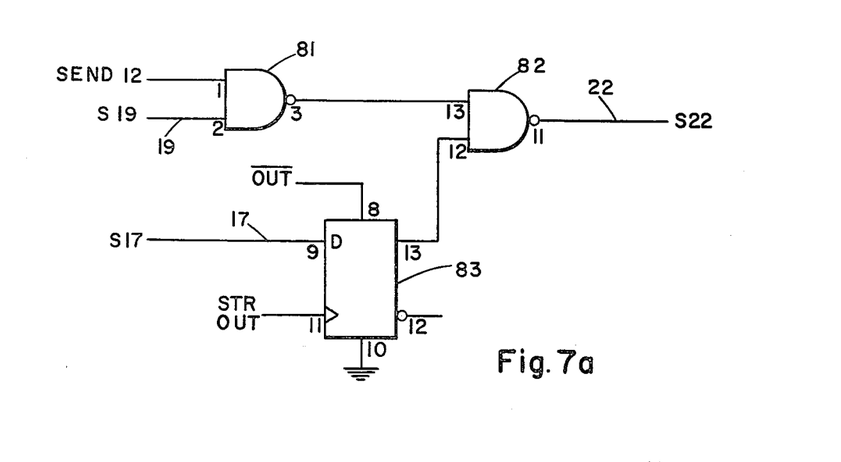
FIG. 7A is a logic diagram of a switch included within the transponder of FIG. 1.
Figure 7B:
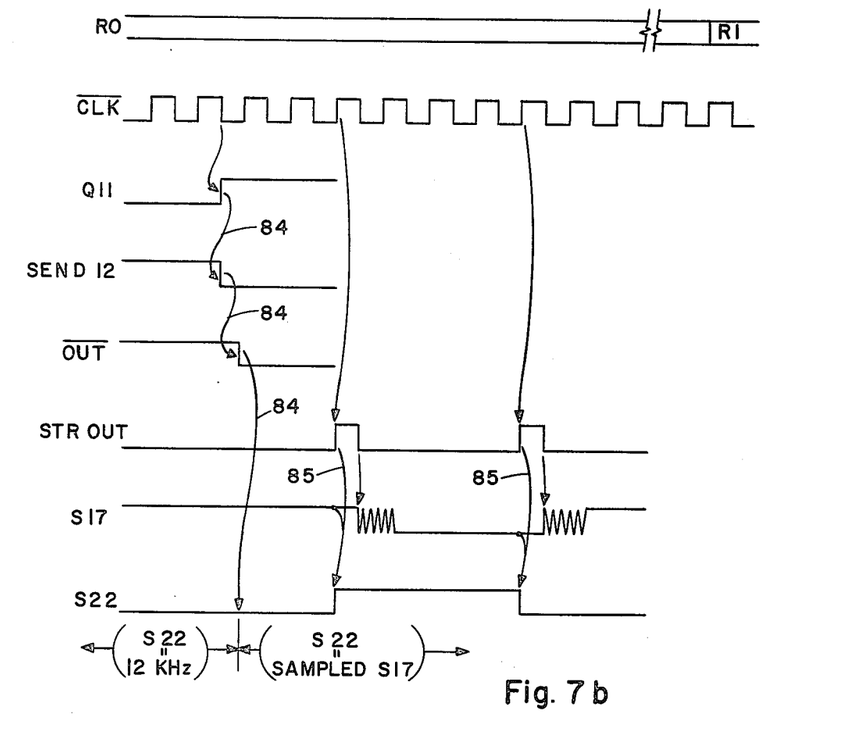
FIG. 7B is a timing diagram illustrating the operation of the circuit of FIG. 7A.

With signal R0 high, the delay line memory elements 64A-64D are conditioned to be read out in the same sequence by which they were addressed in the storage mode. As they are sequentially addressed, the previously stored signals S63 are generated as signals S17 on lead 17. New information is not stored in memory 64A-64D as long as control signal $\overline{WE}$ remains at a logical high. Also in response to signal $\overline{WE}$ going from a logical low to a logical high, flip-flop 71 sets, and signal SEND 12 goes to a logical high. In operation, when signal SEND 12 is high, leader signal S19 is transmitted. In the illustrated preferred embodiment, signal S19 is a single tone frequency signal of 12 kHz lasting for 32 cycles. Signal S19 is generated by counter 73 by means of dividing signal RUNCK by 32. The time duration of signal S19 is determined by a reset applied to flip-flop 71 by counter 73. This reset signal occurs on a lead 77 and is generated by dividing signals S19 by 32. Transition 78 in FIG. 6B illustrates the initial generation of signals SEND 12 and S19, Signal SEND 12 stays high for 32 cycles of signals S19, Subsequently, flip-flop 71 is reset, and in response thereto, flip-flop 72 sets. Flip-flop 72 generates a logic signal $\overline{OUT}$. A high level of signal $\overline{OUT}$ enables signals S17 from delay circuit 12 to be transmitted via switch 18 and hydrophone 21. FIG. 7A is a detailed logic diagram of switch 18, and FIG. 7B is a timing diagram illustrating the operation thereof. Switch 18 includes logical NAND gates 81 and 82, and a triggerable flip-flop 83. Gates 81 and 82 may suitably be comprised of 4011 chips, and flip-flop 83 may suitably be comprised of a 4013 chip. During the time period while signal SEND 12 is high, gates 81 and 82 pass signal S19 to lead 22. Conversely, during the time period when signal SEND 12 is low, and logic signal $\overline{OUT}$ is low, flip-flop 83 and gate 82 pass signals S17 to lead 22. This is indicated in FIG. 7B via the transition 84. Timing signal STROUT couples to the clocking input of flip-flop 83. This signal is synchronized with the memory address signals A0-A9 and R0-R3. It operates to sample and hold signal S17 thus allowing for transients in signal S17 during the sequential readout of the memory. This synchronized sampling is indicated at transitions 85 in FIG. 7B. The sampled signal couples to NAND gate 82, and the output of gate 82 couples to transducer 21. This transducer is conventional in form and converts the electrical signals S22 to acoustic waves which are transmitted to a remote receiver.

Various embodiments of an improved transponder, and of an improved method for communicating therewith have now been described in detail. Further, these detailed embodiments may be modified without departing from the nature and spirit of the invention. For example, memory element 64A-64D may be comprised of serial digital shift registers. In such an embodiment, signals S13B would couple to the input of the shift register while signal S17 would be generated by the output of the shift register. Logical timing signals for shifting the data through the shift register would be derived from logic gates and/or counters and shift registers of the form previously described in conjunction with FIGS. 3A and 4A. In another modification, delay circuit 12 may be comprised of a charge-coupled device in the form of an analog shift register. In that embodiment, signals S13B are stored in sampled analog form. The output of the charge-coupled device couples to hydrophone 21 for retransmission. Logical control signals for the charge-coupled device shift register are derived from logical control circuits such as those described in conjunction with FIGS. 3A and 4A. Charge-coupled devices suitable for this purpose are described in several publications, such as an article in Electronics Magazine on FEB. 28, 1972, pages 62-79.

In still another modification to the above described detailed embodiments, delay circuit 12 is comprised of an acoustic surface wave device. In that embodiment, signals S13 are stored in non-sampled analog form. The output of the surface wave device couples to hydrophone 21 for retransmission under the control of logic signals which are generated by logic gates and flip-flops such as those described herein. A surface wave device suitable for this purpose is also described in several publications, such as are referenced in the Electrical and Electronic Abstracts, Subject Index, 1974.

Figure 8A:
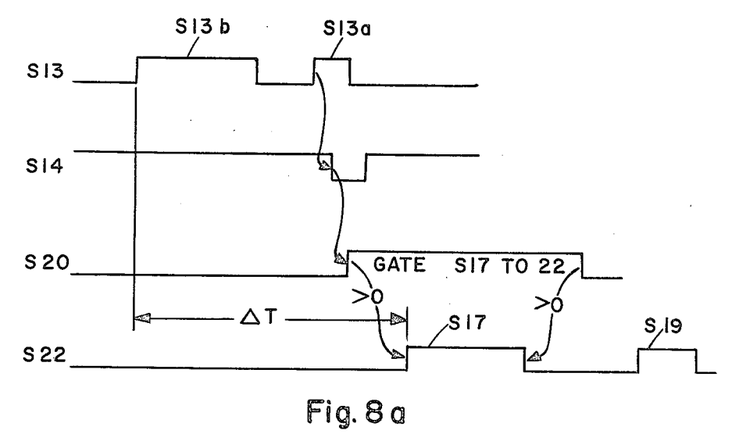
FIGS. 8A and 8B are timing diagrams illustrating the operation of modified versions of the transponder of FIG. 1.

In another modification, the recognition signals and timing signals are operated on in reverse order. That is, the remote source first sends the timing signal, then it sends the recognition signals. As a result, signals S13B on lead 13 preceeds signal S13A, as illustrated in FIG. 8a. In this embodiment, delay circuit 12 operates to continuously delay signals on lead 13 for the time interval ΔT. These delayed signals are not passed from lead 17 to lead 22 however, unless a recognition signal is detected by circuit 11. FIG. 8a illustrates the operation of this transponder.

Figure 8B:
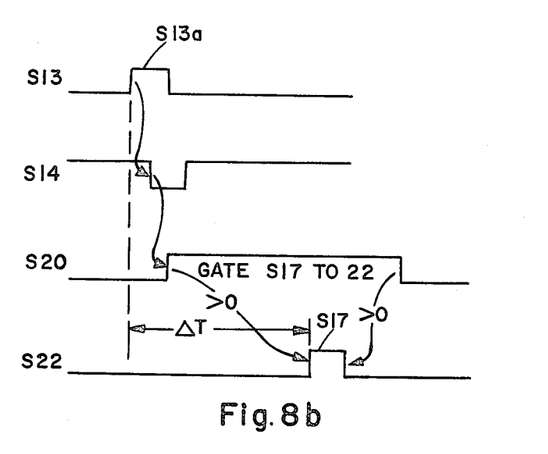

In another modification, only the recognition signals are operated on. That is, the remote source sends recognition signals, but doesn't send timing signals. In this embodiment, delay circuit 12 again operates to continuously delay signals on lead 13 by time interval ΔT. And the corresponding delayed output signals S17 are passed to hydrophone 21 only in response to circuit 11 detecting the recognition signal. The operation of this embodiment is illustrated in FIG. 8b.

Since many modifications and changes may be made to the above described details without departing from the nature and spirit of the invention, it is to be understood that the invention is not limited to said details but is to be defined by the appended claims.

Having described our invention, we now claim:

1. A transponder being operative to receive first input signals followed by second input signals and to provide a precision delayed return of said second input signals in response to the detection of said first input signals regardless of any unpredictable and variable delay incurred in detecting said first input signals due to signal strength variations and the like; said transponder being comprised of;
    means for receiving said first and second input signals;
    means for detecting said first input signals and for generating recignition signals in response thereto anytime prior to the receipt of said second input signals;
    control means for generating first control signals defining a first time interval overlapping the receipt of said second input signals, and for generating second control signals defining a second time interval following said first time interval and being of the same duration as said first time interval;
    delay means for delaying all signals from said means for receiving during said first time interval in response to said first control signals, and for outputting said delayed signals during said second time interval in response to said second control signals; and
    means for transmitting signals representative of said output signals from said delay means during said second time interval.

2. A transponder according to claim 1, wherein said means for delaying is a digital memory.

3. A transponder according to claim 1, wherein said means for delaying is a charge-coupled device shift register.

4. A transponder according to claim 1, wherein said means for delaying is an acoustic surface wave device.

5. A method of operating a transponder in response to first input signals to provide a precision delayed response to second input signals following said first input signals regardless of any unpredictable and variable delay incurred in detecting said first signals due to signal strength variations and the like; said method including the steps of;
    receiving within said transponder said first and second input signals;
    detecting within said transponder said first input signals and generating recognition signals in response thereto anytime prior to the receipt of said second input signals;
    generating first control signals within said transponder defining a first time interval overlapping the receipt of said second input signals, and generating second control signals within said transponder defining a second time interval following said first tme interval and being of the same duration as said first time interval;
    delaying within said transponder all signals received during said first time interval in response to said first control signals, and for outputting said delayed signals during said second time interval in response to said second control signals; and
    transmitting from said transponder signals representative of said output signals during said second time interval.

6. A transponder being operative to receive first input signals followed by second input signals to provide a precision delayed return of said first input signals in response to the detection of said second input signals regardless of any unpredictable ad variable delay incurred in detecting said second input signals due to signal strength variations and the like; said transponder being comprised of;
    means for receiving said first and second input signals;
    means for detecting said second input signals and for generating recognition signals in response thereto;
    control means for continuously generating first control signals prior to the generating of said recognition signals by said means for detecting, and for generating second control signals for a predetermined time interval in response to the generation of said recognition signals by said means for detecting;
    delay means for delaying all signals from said means for receiving for only said predetermined time interval in response to said first control signals, and for outputting said delayed signals in response to said second control signals; and
    means for transmitting signals representative of output signals from said delay means during said second time interval.

7. A transponder according to claim 6, wherein said means for delaying is a digital memory.

8. A transponder according to claim 6, wherein said means for delaying is a charge-coupled device shift register.

9. A transponder according to claim 6, wherein said means for delaying is an acoustic surface wave device.

10. A method of operating a transponder in response to first input signals followed by second input signals to provide a precision delayed return of said first input signals in response to the detection of said second input signals regardless of any unpredictable and variable delay incurred in detecting said second input signals due to signals strength variations and the like; said method including the steps of;

receiving said first and second input signals;

detecting said second input signals and generating recognition signals in response thereto;

continuously generating first control signals prior to the generation of said recognition signals and generating second control signals for a predetermined time interval in response to the generation of said recognition signals;

delaying all of said received signals for only said predetermined time interval in response to said first control signals, and outputting said delayed signals in response to said second control signals; and transmitting signals representative of said output signals during said second time interval.

* * * * *

UNITED STATES PATENT AND TRADEMARK OFFICE
CERTIFICATE OF CORRECTION

PATENT NO. : 4,214,314

DATED : July 22, 1980

INVENTOR(S) : Frederick N. Spiess; Dwight E. Boegeman; Frank V. Pavlicek and Carl D. Lowenstein It is certified that error appears in the above-identified patent and that said Letters Patent are hereby corrected as shown below:

Column 1, after the Title of the Invention, please insert the following:

ACKNOWLEDGEMENT

The Government has rights in this invention pursuant to Contract No. N00014-75-C-0704 awarded by the Office of Naval Research.

Signed and Sealed this

Second Day of February 1982

[SEAL]

Attest:

Attesting Officer

GERALD J. MOSSINGHOFF

Commissioner of Patents and Trademarks